C. H. HOWARD.
PAPER REINFORCING MACHINE.
APPLICATION FILED FEB. 1, 1918.

1,318,151.

Patented Oct. 7, 1919.
9 SHEETS—SHEET 1.

Inventor:
Charles H. Howard
by Robt. P. Hains
Attorney.

C. H. HOWARD.
PAPER REINFORCING MACHINE.
APPLICATION FILED FEB. 1, 1918.

1,318,151. Patented Oct. 7, 1919.
9 SHEETS—SHEET 3.

Inventor:
Charles H. Howard
by Rob't P. Hawes,
Attorney!

C. H. HOWARD.
PAPER REINFORCING MACHINE.
APPLICATION FILED FEB. 1, 1918.

1,318,151.

Patented Oct. 7, 1919.
9 SHEETS—SHEET 4.

Inventor:
Charles H. Howard
by Robt. T. Hains.
Attorney:

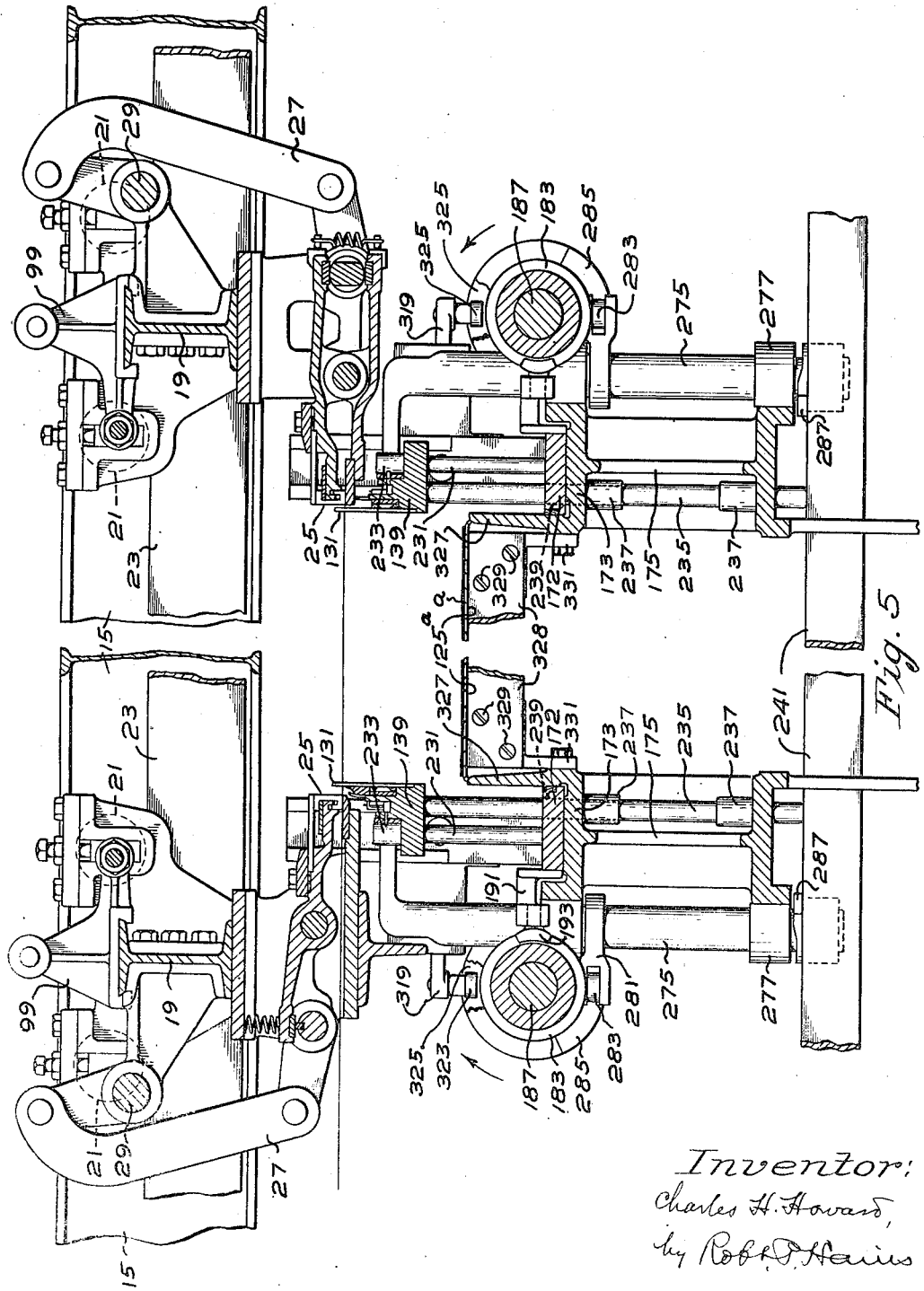

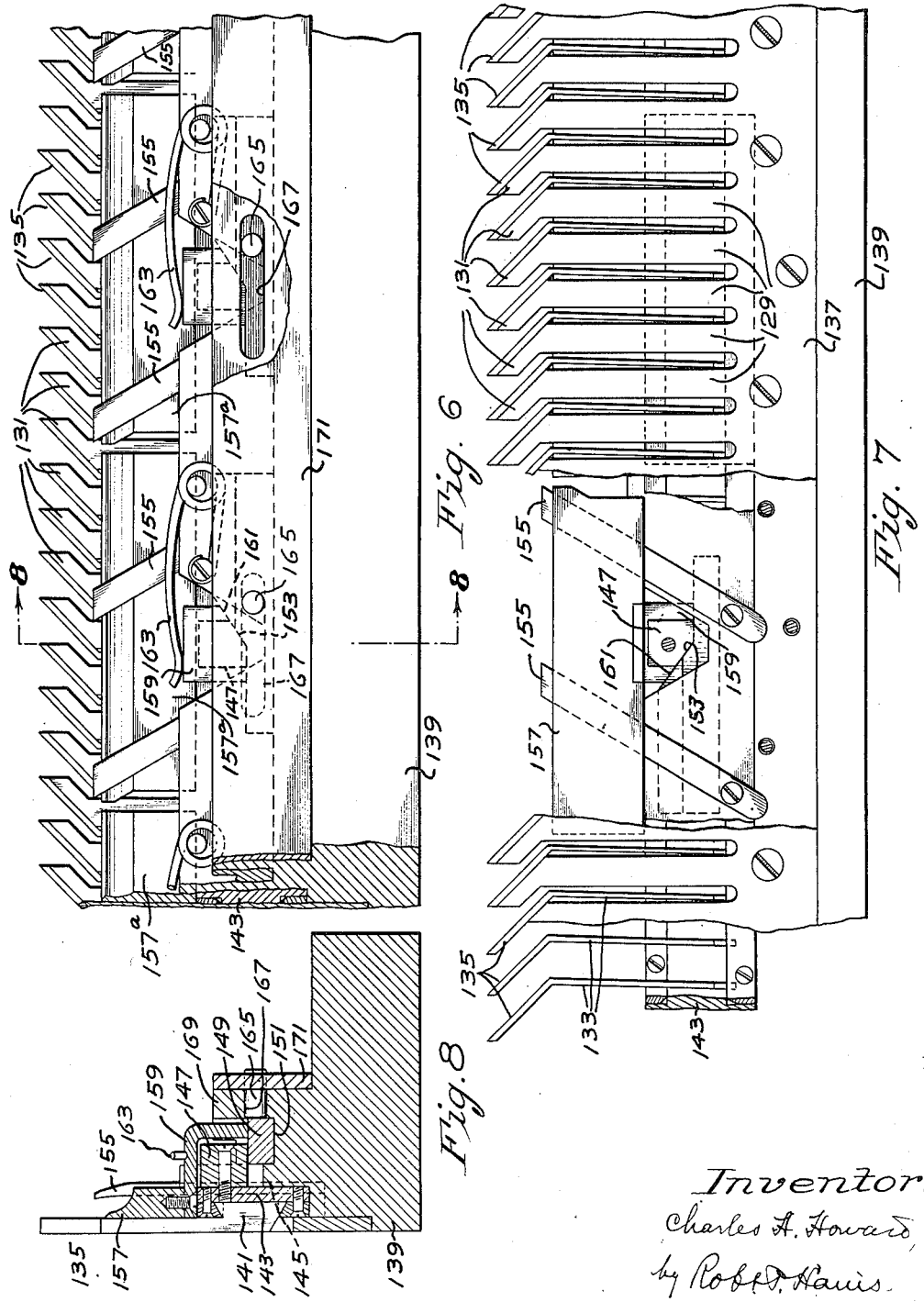

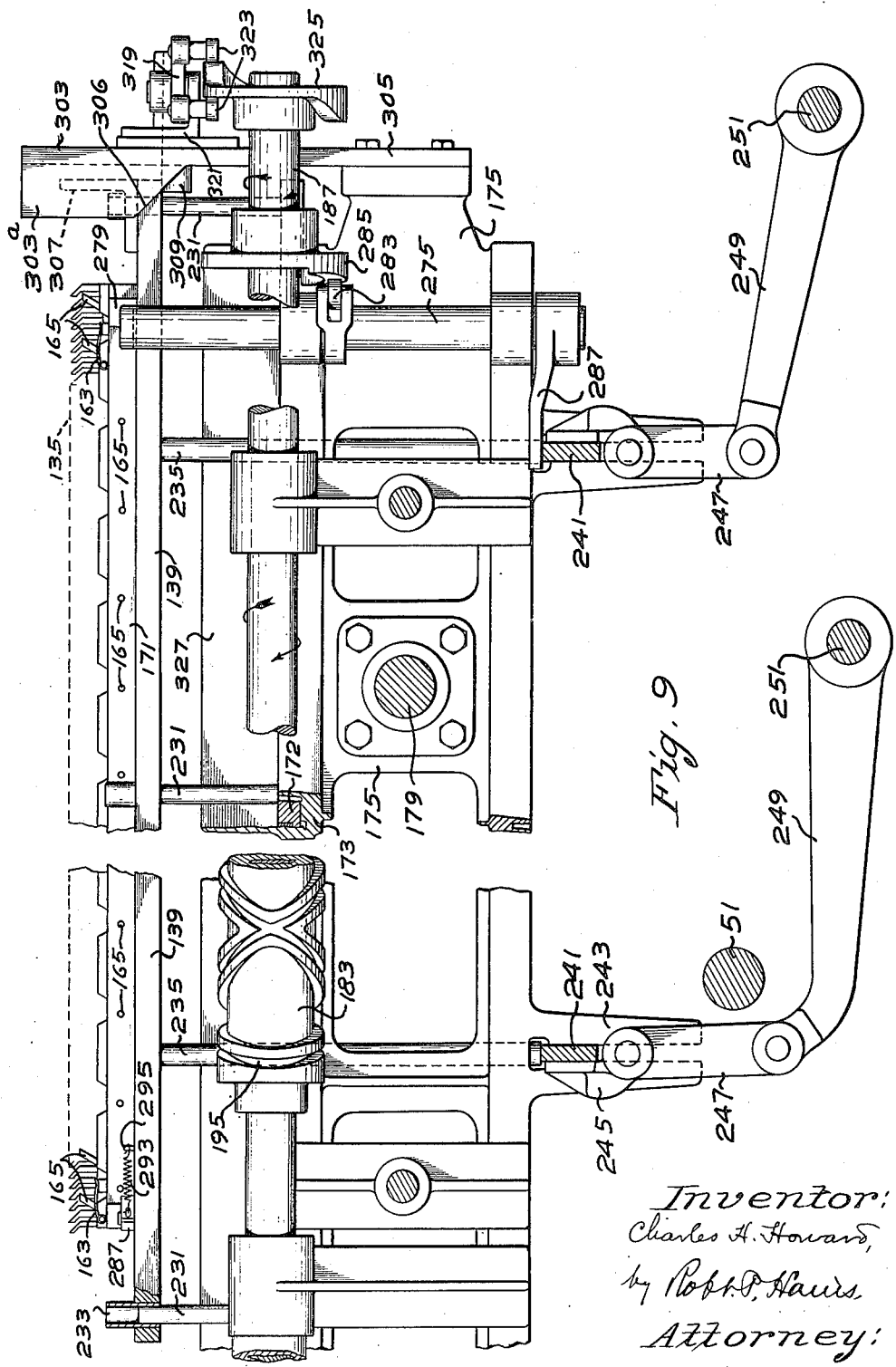

C. H. HOWARD.
PAPER REINFORCING MACHINE.
APPLICATION FILED FEB. 1, 1918.
1,318,151.
Patented Oct. 7, 1919.
9 SHEETS—SHEET 8.
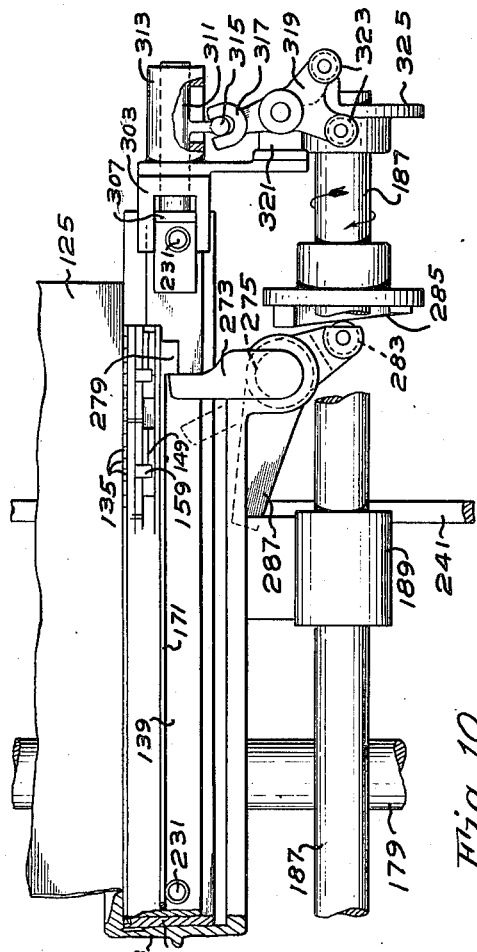
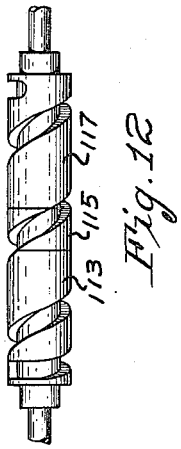
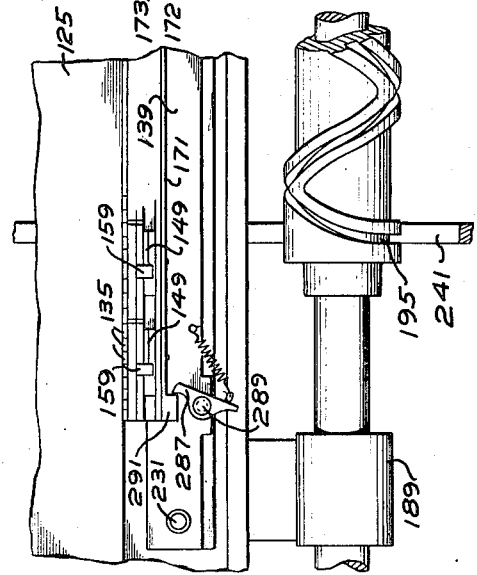
Inventor:
Charles H. Howard,
by Robt. P. Halin.
Attorney.

C. H. HOWARD.
PAPER REINFORCING MACHINE.
APPLICATION FILED FEB. 1, 1918.
1,318,151.
Patented Oct. 7, 1919.
9 SHEETS—SHEET 9.
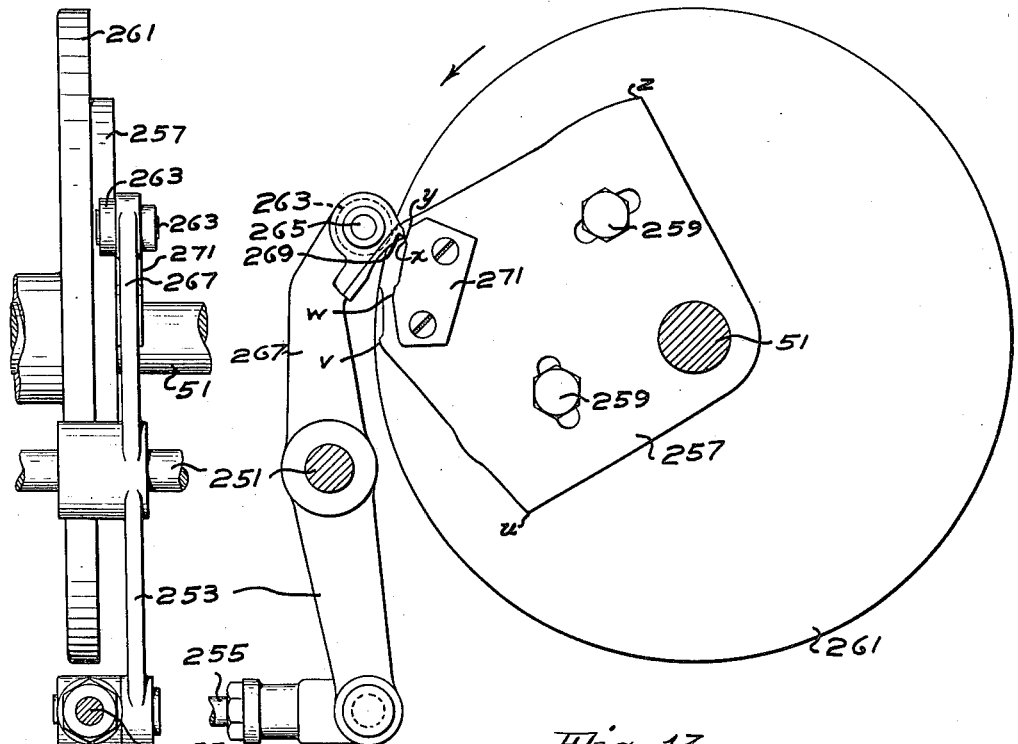
Fig. 13
Fig. 14
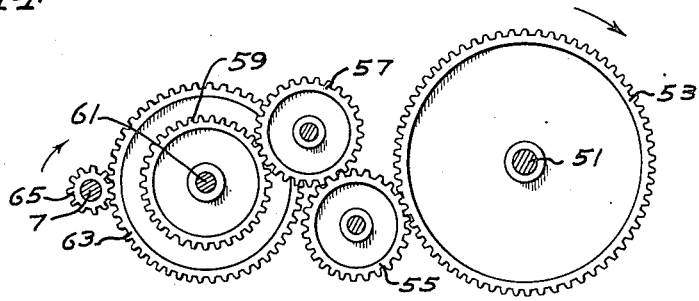
Fig. 15
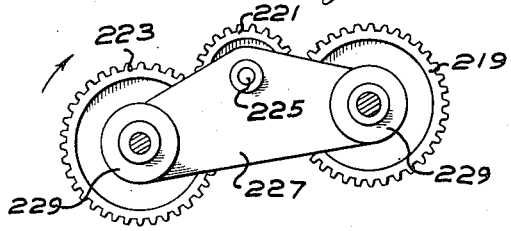
Fig. 16
Inventor:
Charles H. Howard
by Robt. P. Hawes.
Attorney:

UNITED STATES PATENT OFFICE.

CHARLES H. HOWARD, OF SAUGUS, MASSACHUSETTS, ASSIGNOR TO PAPER PRODUCTS MACHINE COMPANY, OF BOSTON, MASSACHUSETTS, A CORPORATION OF MASSACHUSETTS.

PAPER-REINFORCING MACHINE.

1,318,151. Specification of Letters Patent. Patented Oct. 7, 1919.

Application filed February 1, 1918. Serial No. 214,910.

*To all whom it may concern:*

Be it known that I, CHARLES H. HOWARD, a citizen of the United States, and resident of Saugus, county of Essex, and State of Massachusetts, have invented an Improvement in Paper-Reinforcing Machines, of which the following description, in connection with the accompanying drawings, is a specification, like characters on the drawings representing like parts.

The invention to be hereinafter described relates to machines for reinforcing fabrics, and more particularly to such machines for reinforcing paper fabrics or paper stock by the application thereto of reinforcing filaments.

In this general type of machine, the transversely extending reinforcing filaments, which may be threads, cords, wires or similar elements, are drawn from a source of supply by drawing or distending means and placed in transverse position relative to the machine frame or the receiver or carrier to which the filaments are to be transferred. Such reinforcing filaments are of delicate nature in many instances, and in order that they may be accurately drawn from the source of supply and placed in transverse position for application to the receiver, the drawing or distending means must be given its transverse drawing and distending movements, such that the filaments may not be broken.

In prior applications, Serial No. 155,679, filed March 19, 1917, and Serial No. 157,009, filed March 23, 1917, applicant showed, described, and claimed screw or spiral means for imparting to the drawing or distending means its transverse movement, but in the machines illustrated in said prior applications, the drawing or distending means and the screw or spiral are carried by a frame which is mounted for rising and falling movement with relation to the main stationary frame, in order to deliver the filaments to the receiver or carrier; and the drawing or distending means is moved in the direction of feed of the receiver or carrier in order to maintain the filaments in position until they are properly secured thereto. This construction has been found in practice to be efficient and well adapted for its purpose, but the lifting and lowering of the frame, and movement of the drawing or distending means in the direction of feed of the receiver or carrier, and operation of the mechanism carried by the moving frame from a stationary frame requires mechanism which is complex and expensive to manufacture.

The present invention is an improvement on the machines of said applications, and has for one of its objects the provision of means whereby, instead of raising and lowering the frame and the mechanism carried thereby, and moving the drawing or distending means in the direction of feed of the receiver or carrier, the carrier is given movement toward the drawing or distending means, to take the filaments therefrom and then toward the receiver and in the direction of feed thereof, in order to maintain the filaments in position until they are properly secured thereto. As a consequence, the mechanism for drawing or distending the filaments transversely of the machine is desirably simplified.

In Letters Patent, No. 1,211,850, granted to applicant, January 9, 1917, was shown, described and claimed carrier means which is given movement toward the drawing or distending means, to take the filaments therefrom and then toward the receiver and in the direction of feed thereof. The movement of the carrier means in the direction of feed of the receiver in the machine of said patent, is accomplished by a rack and partial gears. This construction is suitable for certain purposes, but the partial gears alternately take hold of and release the rack in order to move the carrier means first in one and then in the reverse direction without continuous positive control over the carrier means.

Another important feature of the present invention consists in moving the carrier means positively to a predetermined position for receiving the filaments from the drawing or distending means, in positively holding the carrier means while receiving the filaments, and in positively moving the carrier means in unison with the receiver in order to maintain the filaments in position until they are properly secured thereto. In carrying this feature of the invention into practical effect, the carrier means may be connected to screw or spiral means mounted with its axis extending longitudinally of the machine and rotated by suitable means, so that the movement of the carrier means is positive and smooth at all points of its travel. It enables the carrier means to always start to travel with the receiver at the same point, move at the same speed as the receiver while holding the filaments on the receiver, and have a sufficiently slow or gradual start and finish at the ends of its traverse to obviate all shock and vibrations and produce the best results.

When two carriers are employed, one at each side of the receiver, the screw or spiral means is particularly advantageous, as it permits the two carriers to be moved positively in exact unison with each other and with the receiver, thereby producing the same control over opposite ends of the filaments and desirably contributing to the production of perfect work.

In a prior application, Serial No. 134,259, filed December 1, 1916, applicant showed, described and claimed carrier means in the form of sprocket chains, the links of which are provided with relatively movable fingers which constitute holding jaws for taking the filaments from the drawing-in means, suitable operating means being employed for opening and closing said jaws to grip and release the filaments at the times required. Each link is also provided with cutter means for severing the filaments from the source of supply.

Another feature of the present invention consists in the provision of fingers or holding jaws which, instead of being on links which travel in an endless path, may be reciprocated in a rectilinear path. In carrying this feature of the invention into practical effect, the fingers or jaws may be mounted on a bar or carrier which traverses on suitable guide means under the control of the screw or spiral means, referred to.

Other features of the invention consist in simple and effective means for lifting the carrier jaws to the plane of the distended filaments, improvements in the means for opening and closing said jaws, and improvements in the means for operating the cutter means as required.

With the aforesaid and other objects in view, the character of the invention may be best understood by reference to the following description of one good form of means for carrying the invention into practical effect, shown in the accompanying drawings, wherein:—

Fig. 5 is an enlarged sectional elevation showing the distending means, the carrier means for receiving the filaments from the distending means and moving the same longitudinally of the machine, and the screw or spiral means for traversing the carrier means;

Fig. 6 is an enlarged sectional elevation showing one side of the fingers or jaws of the carrier means, the cutter means for the filaments, and operating devices therefor;

Fig. 7 is an enlarged sectional elevation of the opposite side of the construction shown in Fig. 6, some of the parts being broken away to show parts beyond;

Fig. 8 is a vertical section on line 8—8 of Fig. 6;

Fig. 9 is an enlarged sectional elevation showing the carrier means, means for raising and lowering the carrier means, means for closing the carrier jaws when in elevated position, and means for traversing the carrier means longitudinally of the machine;

Fig. 10 is an enlarged view in plan and partially in section of the carrier means, means for closing the jaws thereof, and a portion of the screw or spiral means for traversing the carrier means;

Fig. 11 is a plan of a portion of the carrier means and the means for opening the jaws thereof;

Fig. 12 is a detail view of the extensible screw or spiral means for imparting the traverse to the carrier for the distending means transversely of the machine;

Fig. 13 is a detail view showing the cam means for producing the raising and lowering movements of the carrier means;

Fig. 14 is an end elevation of the parts shown in Fig. 13;

Fig. 15 is a view showing the train of gears in the transmission from the main driving shaft to the cam shaft; and Fig. 16 is a section on line 16—16 of Fig. 2 showing a train of gears in the drive from the main shaft to the screw or spiral means for traversing the carrier means longitudinally of the machine.

Figure 1:
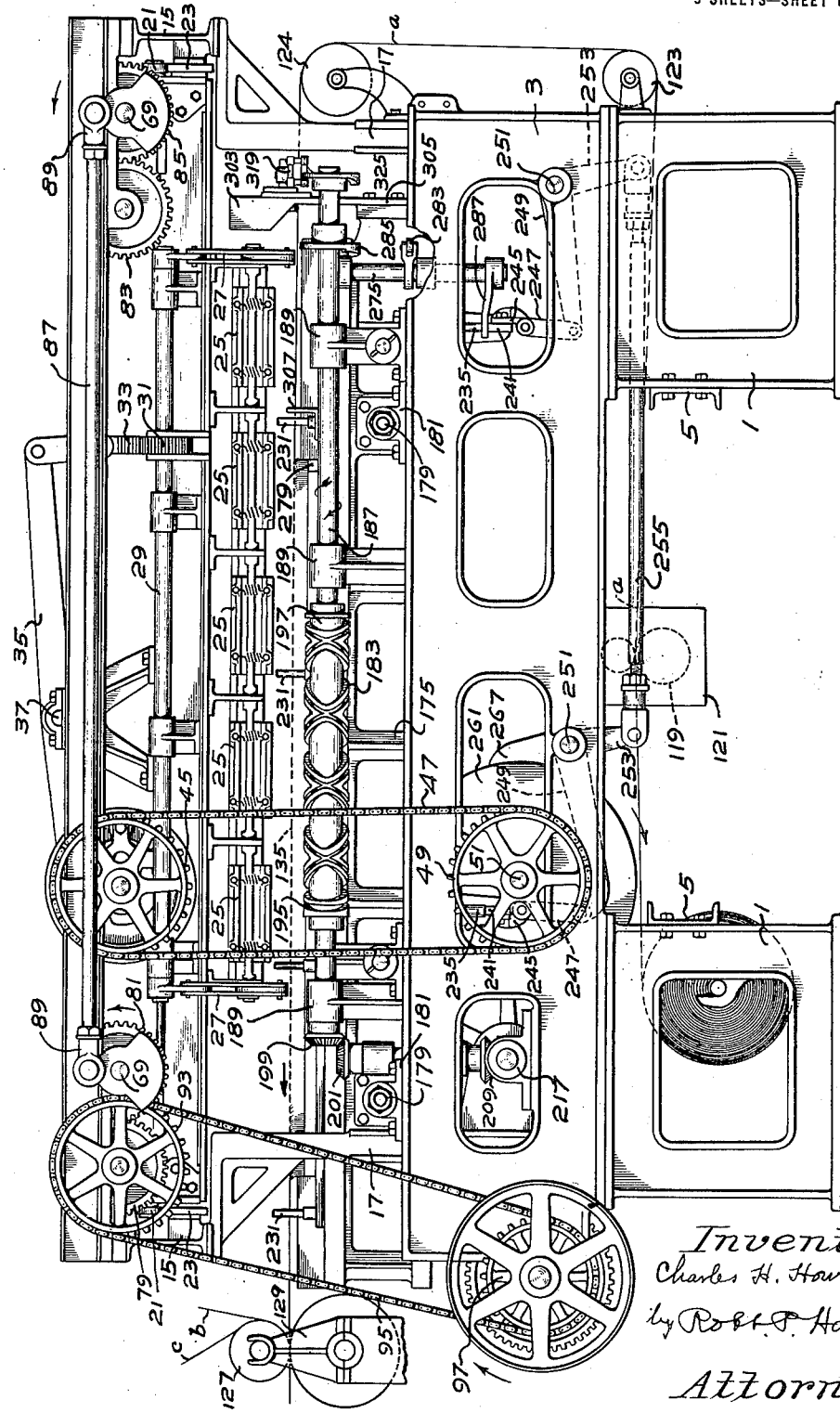
Figure 1 is a side elevation of a machine embodying the present invention.

Referring to the drawings, the machine frame may be of any suitable character for supporting the operating parts, and may comprise base blocks 1 (Figs. 1 and 2) surmounted by the frame 3 and braced by suitable ties 5. The main driving shaft 7 is journaled in suitable bearings 9 mounted on one end of the frame 3, said shaft being provided with the usual fast and loose pulleys 11 and 13, which may receive a belt and cause the operating parts of the machine to be actuated or rest as required.

Instead of maintaining the drawing or distending means on a supporting frame having a rising and falling movement with respect to the main frame as in the prior applications, referred to, the frame carrying the drawing or distending means, hereinafter termed the gripper frame, is stationary, and comprises an upper framework 15, generally rectangular in plan, and mounted on corner posts 17 rising from and fixed to the main frame 3.

Mounted upon the gripper frame 15 for movement transversely of the machine, is the gripper carrier frame 19 having rollers 21 which travel on the traverse trackways 23, the construction being such that the gripper carrier frame may move transversely of the gripper frame, substantially as fully described in said prior application, and for the purpose of enabling the drawing or distending means to engage reinforcing filaments and draw or distend them from a source of supply into transverse relation to the machine. The gripper carrier, as in said applications, may have mounted thereon, a series of drawing or distending means, such as grippers 25 comprising jaws for grasping and releasing the reinforcing filaments. In the present instance of the invention, the gripper carrier is provided with five sets of such grippers, but as will be obvious to one familiar with this class of machine, the number of grippers may be varied to suit the conditions of use. The grippers 25 (Fig. 5) comprise relatively movable jaws, which may be of appropriate character to seize and release reinforcing filaments, and said jaws may be appropriately operated as by means of arms 27 actuated from the rock shaft 29, the pinion 31 (Figs. 1 and 2), and rack 33, all of which parts may be similar to the corresponding parts described in said applications. The rack 33 may be operated by a lever 35 loosely mounted on a shaft 37 mounted in bearings 39 (Figs. 3 and 4) on the upper frame 15, referred to. The lever 35 may be rocked as required by a cam 41 operatively connected to one end of said lever and splined to a shaft 43 journaled in bearings carried by the upper frame. The shaft 43 may be driven by a sprocket wheel 45 (Fig. 4) fast on one end thereof and connected by a sprocket chain 47 (Fig. 1) with a sprocket wheel 49 fast on one end of the cam shaft 51 journaled in suitable bearings in the frame 3. The opposite end of said cam shaft has a large gear 53 (Figs. 3 and 13) driven by intermediate pinions 55 and 57 from a gear 59 on a stud shaft 61 mounted on the frame 3, said shaft having a gear 63 fast thereon driven by a pinion 65 fast on the main driving shaft 7, referred to. The construction is such that the cam shaft for operating the grippers may be driven from the main shaft through the transmission mechanism described and produce the opening and closing of the grippers as required. One of the jaws of each gripper may be constructed with relatively movable portions, so that a plurality of reinforcing filaments of different size may be grasped by and between the jaws, such construction and operation being substantially the same, as more fully described in Letters Patent, No. 1,211,852, granted to applicant, January 9, 1917.

The drawing-in or distending of the filaments transversely of the machine may be effected by suitable drawing-in or distending means in the form of grippers, as in the prior application referred to, and while one such drawing-in or distending means movable transversely of the machine may be sufficient in some cases, in the present instance of the invention, the drawing-in means is formed of two sets of grippers, one disposed at each side of the machine, and each of which is moved toward the median longitudinal line of the machine, and then back again to the side thereof substantially as described in said prior applications.

Figure 2:
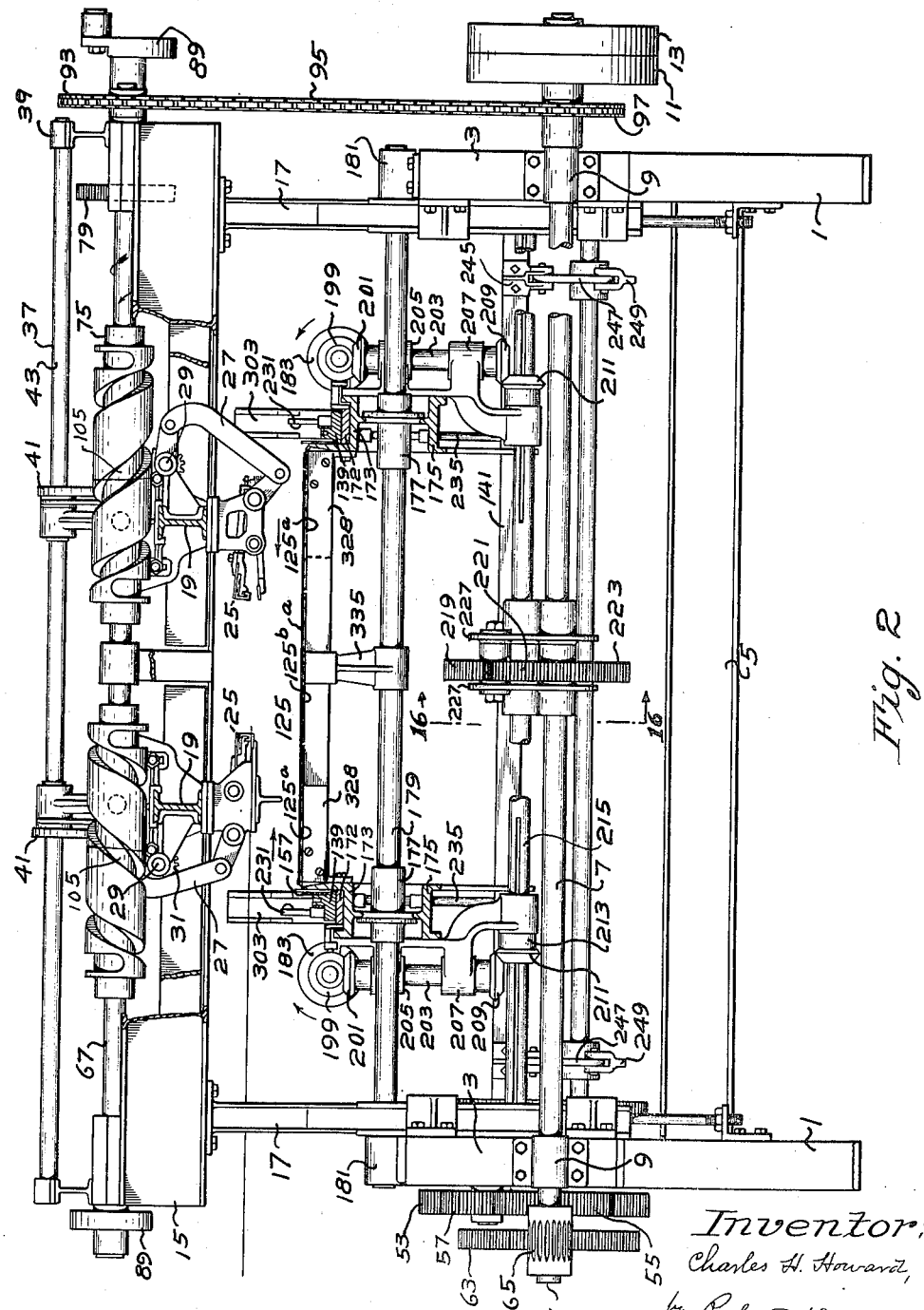
Fig. 2 is an end elevation of the same machine, some of the parts being shown in section and others broken away to show parts beyond.

The means for imparting the transverse movements to the distending means may comprise companion screw or spiral shafts 67 and 69 (Figs. 3 and 4) mounted in the gripper frame 15 adjacent one end thereof, and the companion shafts 71 and 73 adjacent the opposite end of said frame. The several shafts 67, 69, 71 and 73 may be each provided with a screw or spiral on a sleeve 75 secured by pins 77. In the present instance, since two drawing or distending means are employed, the screw or spiral shafts 67, 69, 71 and 73 are provided with screws or spirals, one for actuation of each of the drawing or distending means, that is, one screw or spiral at one side of the median line of the machine may be employed to actuate the drawing or distending means at that side of the machine, and another screw or spiral may be employed to actuate the drawing or distending means at the other side of the median line of the machine, the construction being such that upon rotation of said shafts, the drawing and distending means will be moved toward and from each other to draw or distend the reinforcing filaments into transverse relation with the receiver to which they are to be applied. Where two drawing or distending means are employed, as shown in Fig. 2, the screws or spirals on the shafts 67, 69, 71 and 73 at opposite sides of the median side of the machine are reversely arranged, that is, one is a right and the other is a left screw or spiral, the construction being such that when the shafts are rotated, the drawing or distending means will be moved toward and from each other as described.

Where the spirals are mounted on separate shafts, instead of being made reverse, as they would be if they were both on the same shaft, are made similar, that is, the screw or spiral on the shafts 67 and 69 have the same twist, and means are interposed between said shafts to rotate them in opposite directions. To accomplish this, a gear 79 fast on the shaft 67 meshes with a gear 81 fast on the shaft 69. Similarly, the shafts 71 and 73 may be rotated in opposite directions by gears 83 and 85 fast on said shafts respectively. In order that the companion gears 79 and 81 may rotate in unison with the companion gears 83 and 85 to effect proper transverse movement of the drawing or distending means at both ends of the gripper frame, the shafts 69 and 73 may be connected by connecting rods 87 pivotally connected to counter-balanced cranks 89 fast on the opposite ends of said shafts 69 and 73.

To contribute to the support of the shafts 67, 69, 71 and 73, they may be provided with bearing brackets 91 intermediate the ends thereof and secured to the gripper frame 15.

To drive the shafts of the screw or spiral means, in the present instance, a sprocket wheel 93 (Figs. 2 and 4) may be mounted fast on one end of the shaft 67 and be connected by a sprocket chain 95 with a sprocket wheel 97 fast on the main driving shaft 7. It will be noted that since the gripper frame 15 is stationary with respect to the main frame 3, simple and effective means may be used to transmit the drive from the main shaft to the spirals.

To connect the screws or spirals with the gripper carriers, the gripper carrier 19, referred to, may be in the form of I-beams, and a shoe or slide 99 (Figs. 2 and 5) may be mounted to slide on the upper flange of the I-beam. The shoe or slide may have an arm 101 carrying studs or rollers 103 and 104 (Figs. 3 and 4) adapted to operatively engage with the screw or spiral groove 105 of the screw or spiral shafts.

To shift the slide or shoe to and from the spirals of the shafts 67 and 69 at the times required, the shoe or slide 99 may be connected by a rod 107 (Figs. 3 and 4) with a cam 109 splined on the cam shaft 43, referred to. Since this cam is fully shown and described in the application, Serial No. 157,009, referred to, detailed description thereof in the present application is unnecessary.

Figure 3:
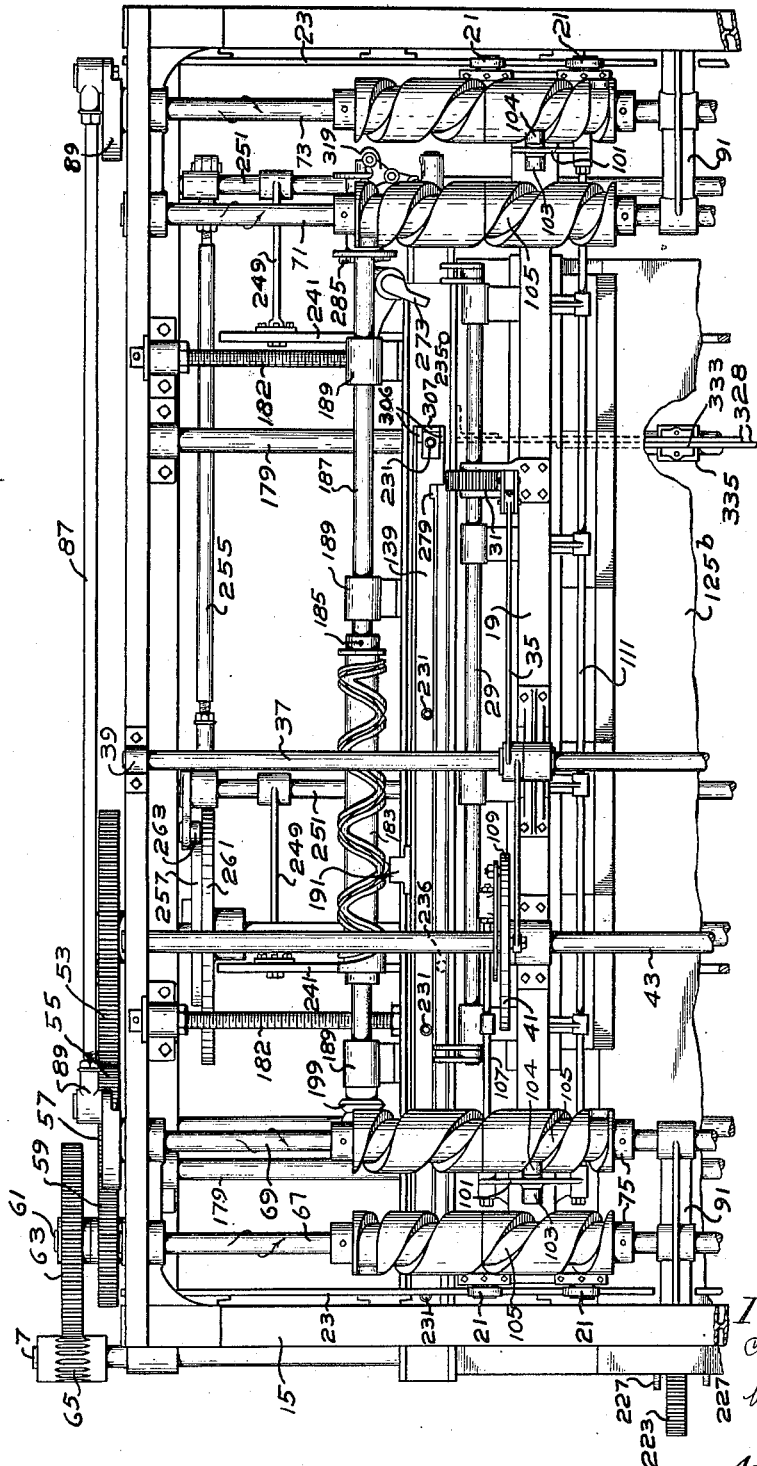
Fig. 3 is a plan view of one-half of the same machine.
Figure 4:
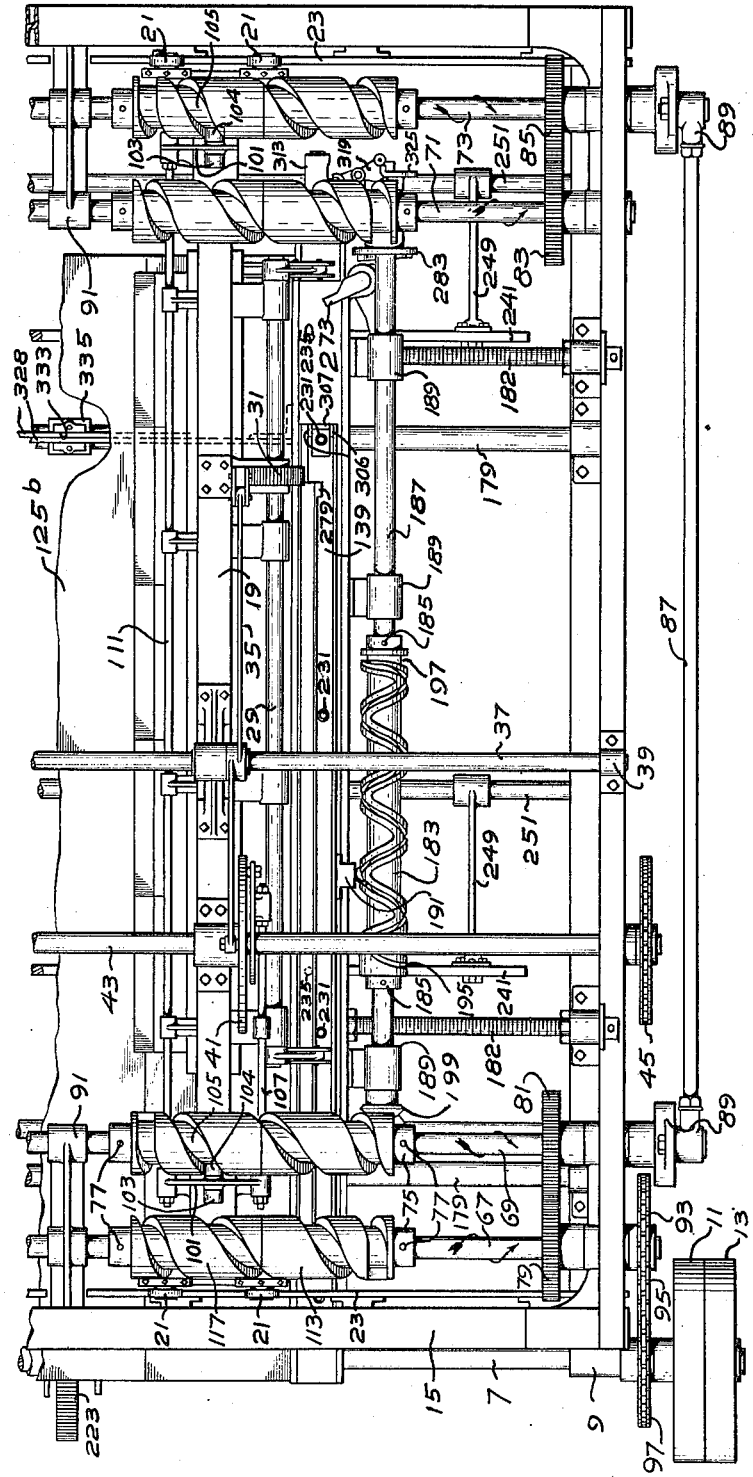
Fig. 4 is a similar view in plan of the remaining one-half of the machine.

When the shoe for the spirals for the shafts 67 and 69 is shifted, the corresponding shoe for the spirals of the shafts 71 and 73 should be shifted. To accomplish this, said shoes may be connected by a connecting rod 111 (Figs. 3 and 4).

The screw or spiral means may have a circular or neutral portion at each end thereof, and a pitch which gradually increases from each end of the spiral toward the central portion thereof, as shown and described in said applications.

It is desirable that the machine should be adapted to apply reinforcing filaments to receivers of varying widths. To accomplish this, the screw or spiral means may have a sectional construction, that is, the screw or spiral means may be formed of a plurality of sleeve sections mounted fast on the shaft therefor. In the present instance, three spiral sections 113, 115 and 117 are shown in Fig. 12, the construction being such that the intermediate section 115 may be interposed between the sections 113 and 117 to increase the extent of the traverse of the distending means. The sections 113 and 117 may have circular or neutral portions at the ends thereof, and a pitch gradually increasing from the ends toward the intermediate section, and the latter may conveniently have a pitch greater than the pitch of the end sections. Thus, the construction is such that the speed of traverse of the distending means may be gradually reduced toward the ends of its traverse, both for narrow or wide receivers, and the distending means may have its desirable rapid traverse intermediate said ends.

As stated, the present invention contemplates that after the filaments have been distended transversely of the machine by the distending means, they shall be taken from the distending means toward the receiver, and then be moved longitudinally of the machine in unison with the receiver to maintain the filaments in position thereon until they are appropriately secured thereto. The web of paper or other material to be reinforced may be taken from a suitable source of supply and passed longitudinally of the machine over suitable guiding means. In the present instance, the web $a$ is passed over a gumming roll 119 (Fig. 1) supported in suitable position to apply to one surface of the web a suitable adhesive in a tank 121. Obviously the web may have been previously gummed and dried, in which event, the roll 119 would be used to supply moisture to the gummed surface of the material. The web may pass thence over guide rolls 123 and 124 located at the feeding-in end of the machine, and thence over a guide table 125 (Fig. 5) longitudinally of the machine, as indicated by the arrow in Fig. 1, between the rolls 127 and 129 at the delivery end of the machine, which may be in the form of calender rolls for pressing the material passing between them into close relationship. It is also then the purport of the invention, that longitudinal filaments *b* may be placed upon the sheet material or web, so that when completed, the web or sheet material shall contain both longitudinal and transverse strengthening filaments.

The invention further has in view the superposing upon the sheet material on which the reinforcing filaments have been laid, of another web of paper or other material *c*, which may be led by suitable means to and between the rolls 127 and 129, as will be readily understood.

The carrier means for taking the transverse filaments from the distending means, in the present instance of the invention, comprises fingers 129 (Figs. 6, 7 and 8), which constitute one of the holding jaws for taking one of the reinforcing filaments from the distending means, said fingers being preferably provided with inclined upper portions 131. Companion fingers or holding devices coöperate with the fingers 129 to hold the filaments, and in the present form of the invention, comprise yielding members 133 which constitute other of the holding jaws, and are preferably provided with inclined upper portions 135. The fingers 129 may be variously mounted, but in the present form of the invention, they project upward from a plate 137 secured to a carrier or bar 139. The yielding fingers 133 may be variously mounted, but in the present form of the invention, they have dovetail shanks 141 (Fig. 8) secured in a bar 143 mounted in a recess in the carrier 139. The length of the series of jaws or fingers and their carrier means may vary, but in the present instance, the length thereof is suitable to receive simultaneously the filaments transversely distended by the five sets of grippers.

The fingers or jaws may be relatively movable to clamp and hold the filaments when lifted to the plane of the latter, as will presently appear. To impart the relative movement to said fingers or jaws, the bar 143 carrying the yielding fingers, may have a lug 147 secured thereto, the construction being such that should the lug be raised or lowered, it will cause the yielding fingers to correspondingly rise or fall. Coöperating with said lug is a cam block 149 adapted to slide in a guideway 151 in the carrier or bar 139, said cam block having an inclined portion 153 (Fig. 7) adapted to engage a correspondingly inclined portion on the lug 147, the construction being such that when the cam block 153 is moved toward the right (Fig. 7), it will correspondingly raise the lug 147 and perforce raise the yielding fingers 133 and bring the inclined portions 135 thereof in yielding clamping relation with the inclined portions 131 of the fingers 129.

In order that the movement of the inclined portions 135 may be in a direction toward and from the inclined portions 131, inclined guides 155 may be secured to the carrier 139 and project into inclined grooves in the bar or holder 143 for the yielding fingers, the construction being such that when the cam block 153 is shifted to the right of Fig. 7, it will cause the yielding fingers to have a composite movement upward and toward the right into proper clamping relation with respect to the fingers 129.

Suitable cutter means may be provided on the jaw carrier for severing the filaments from their source of supply directly after their transfer from the grippers to said jaws. In the present instance, a cutter 157 (Figs. 6, 7 and 8) is mounted on the jaw carrier adjacent the jaws, and also guided in its upward and downward movement by the diagonal guides 155, referred to. This cutter may be continuous and of a length equal to the length of the series of jaws on the carrier, or it may consist of a plurality of sections 157ª, as will be noted in Fig. 6. To impart the severing movement to the cutter, it may have a block or arm 159 projecting laterally and downward over the lug 147, referred to, and said arm or block may have an inclined portion adapted to co-act with a similarly inclined portion on the cam block 149, referred to, the construction being such that when the cam block is moved to the right (Fig. 7), it will cause the jaws to grasp and hold the filaments, and further movement of the cam block will cause the cutter to rise and cut the filaments while held by the jaws. In the present instance of the invention, a series of cam blocks and lugs may be provided for closing the carrier jaws and imparting the severing movement to the cutter, although it will be understood that their number may be varied as desired.

Suitable means may be provided to cause the resilient fingers or jaws and the cutter to assume their lowered or initial position when the cam blocks are moved back to their normal position, as shown in Figs. 6 and 7. In the present instance, spring means typified herein as a plurality of leaf springs 163 are secured to the carrier and present free ends which bear upon the arms or blocks 159.

Suitable means may be provided to slide the cam blocks relatively to the jaw carrier to close the jaws and impart the severing movement to the cutter. To accomplish this, in the present instance, the cam blocks are provided with pins 165 projecting from said blocks through elongated openings 167 in a flange 169 projecting upward from the jaw carrier, said pins projecting thence into holes in an operating member or plate 171 mounted on the jaw carrier and adapted to slide along the face of the carrier flange 169, as will be noted in Fig. 8. When the jaw carrier is raised to project the jaws into the plane of the distended filaments held by the grippers, this plate may be shifted by means to be described to cause the jaws to grasp the filaments and to cause the cutter to sever the filaments from their source of supply; and after the jaw carrier has lowered and moved in unison with the web to be reinforced, or other receiver, the operating plate 171 is shifted in an opposite direction by means to be described, to allow opening of the jaws to release the filaments, and lowering of the cutter to its original position.

The carrier and its jaws are adapted to reciprocate in a rectilinear path in order that it may intermittently convey successive series of filaments in unison with the web or receiver for a sufficient distance to allow the filaments to be properly positioned thereon. To support the jaw receiver and guide the same in its reciprocatory movement, suitable means may be provided, in the present instance, in the form of a base 172 (Figs. 4 and 5) for the carrier adapted to slide in a channel 173 mounted on a frame 175 (Figs. 1, 2, 5 and 10) having bosses 177 slidable on rods 179 mounted in brackets 181 on the main frame 3. Said frame may be adjusted along said rods by screws 182.

An important feature of the invention relates to the means for imparting the reciprocatory movement of the jaw carrier to cause the same to travel intermittently in unison with the web or receiver for a sufficient distance to enable the filaments to be properly positioned thereon. In the present instance of the invention, to accomplish this, screw or spiral means (Figs. 1, 4, 5 and 9) is provided, constructed and arranged to provide a dual screw or spiral, one for causing the jaw carrier to travel in one direction, and the other for causing the jaw carrier to travel in the opposite direction. In the present instance, said screws or spirals are reversely made and formed on a sleeve 183 secured by pins 185 on a shaft 187 extending longitudinally of the machine and journaled in bearing brackets 189 projecting laterally from the frame 175 for supporting the channel guide 173. Suitable means is provided for operatively connecting the screws or spirals with the jaw carrier. In the present instance, this means is in the form of an arm 191 (Figs. 4 and 5) projecting laterally from and secured to the carrier base 172 and having a swiveled shoe or follower 193 projecting into the spiral groove, said shoe being of sufficient length to travel properly in one spiral, and cross the other spiral without interference therefrom. Suitable means may be provided for alternately operatively connecting the shoe or follower with the reverse screws. Where the reverse screws are mounted on the same sleeve and cross one another at intervals, this may be conveniently accomplished by forming the reverse screws with communicating portions 195 and 197 adjacent the opposite ends of the sleeve, the construction being such that the shoe or follower will automatically be reversed at the ends of said screws. When the shoe or follower and perforce the jaw carrier is at the right end of its travel (Fig. 1), the distended filaments are transferred from the grippers to the jaws of the carrier and severed from their source of supply. It is, therefore desirable that the shoe or follower should have a period of dwell when at the right end of the screw or spiral means to allow sufficient time for the transferring and severing of the filaments. In the present instance, this may be conveniently accomplished by forming the groove with a circular or neutral portion 197, as will be noted in Fig. 1, the construction being such that the shoe or follower will dwell while the screw or spiral means continues to rotate before said shoe or follower will commence its travel toward the left of Fig. 1. When the shoe or follower is at the left end of the spiral means, the filaments are released from the carrier jaws, but this may be accomplished without requiring any dwell of the shoe or follower at the left end of its traverse. Therefore, the groove portion 195 may be formed to effect prompt reversal of the shoe or follower and perforce the jaw carrier. The portions of the screw or spiral means intermediate the end portions 195 and 197 may be of uniform pitch to cause the shoe or follower to travel at a uniform rate toward the left (Fig. 1) in unison with the travel of the web or receiver to which the filaments are applied.

Since the upper end portions 131 and 135 of the fingers or jaws of the carrier, in the present instance, are inclined as described, it is desirable to impart a slight longitudinal movement to the carrier to the left (Fig. 1) as it is moved upward to receive the filaments from the grippers, by means to be described. To permit this slight longitudinal movement, the groove portion 197 of the screw or spiral means may be widened somewhat to allow lateral movement of the shoe in said portion.

In the present instance of the invention, two carriers may be provided at opposite sides of the median longitudinal line of the machine to grasp the filaments adjacent the distending means or grippers at the opposite sides of said median line. These carriers and the devices carried thereby may be similar, with the exception that merely one of the carriers is equipped with cutter means to sever the filaments from their source of supply. Where two carriers are provided, two screw or spiral means are provided extending longitudinally of the machine, and preferably are rotated in unison, in order that the opposite ends of the distended or severed filaments may be fed equally by the carriers in unison with the web or receiver. To rotate the shafts 187 for the screw or spiral means, they may have bevel pinions 199 (Figs. 1, 2, 3 and 4) fast on ends thereof meshing with bevel pinions 201 fast on the upper ends of vertical stud shafts 203 journaled in bearings in brackets 205 and 207 carried by the frames 175 supporting the channel guides 173. The vertical stud shafts also have bevel pinions 209 fast thereon meshing with bevel pinions 211 on short sleeves 213 journaled in the brackets 207 and splined to a shaft 215 journaled in bearings in brackets 217 mounted on the main frame 3. The shaft 215 has a gear 219 (Figs. 2 and 16) fast thereon meshing with an intermediate gear 221 meshing in turn with a gear 223 fast on the main driving shaft 7, referred to, the intermediate gear being carried by a stud shaft 225 journaled in bearings in a pair of spaced plates 227 having sleeves 229 mounted on the shafts 7 and 215. The construction described is such that the shafts 187 for the screw or spiral means may be continuously rotated and cause the shoes 193 and perforce the jaw carriers to traverse on the channel guides 173 and convey successive series of filaments in unison with the web or receiver. The screw or spiral means described is very advantageous for this purpose, since it feeds the carrier positively in unison with the web or receiver and maintains a desirable positive control over the carrier, insuring accurate positioning of the filaments on the web or receiver.

As stated, the holding fingers or jaws of the carriers are raised to the plane of the filaments distended by the grippers, and then lowered in readiness to travel with the web or receiver. Suitable means may be provided to produce the raising and lowering of the holding fingers or jaws for these purposes. In the present instance, to accomplish this, the carriers or bars 139, referred to, are movable toward and from the carrier bases 172, which slide along the channel guides as described. To guide the carrier bar 139 in its raising and lowering movements, a plurality of pins 231 (Figs. 1, 5 and 10) may be mounted on the base 172 and project upward through the bar 139 and bosses 233 thereon. To elevate the carrier bar above its base, push rods 235 may project upward through guide bosses 237 on the frame 175, and thence upward through the guide channel 173, and thence through elongated slots 239 in the carrier base. The upper ends of said push rods are adapted to engage the bottom of the bar 139, and the lower ends are adapted to rest upon cross bars 241 (Figs. 3, 4 and 9) extending transversely of the machine, and guided by forks 243 depending from the frames 175. Each cross bar has a pair of brackets 245 secured thereto and connected by links 247 with arms 249 fast on a rock shaft 251. Suitable means may be provided to cause the shafts 251 to rock in unison. This may be accomplished by arms 253 (Fig. 1) fast on said shafts and connected by an adjustable connecting rod 255. Suitable means may be provided for actuating the rock shafts 251 and the connections with the push rods to raise and lower the carriers. It is desirable that when the carrier has traveled to the right of Fig. 1, it should be promptly raised to elevate the holding fingers or jaws to the filaments distended by the grippers, and after it has been elevated, it should dwell for a short period to allow the filaments to be transferred from the grippers to the carrier jaws, and to allow the cutter means to sever the filaments from their source of supply. Also, where the jaws or fingers have inclined portions as shown herein, it is desirable to move the jaws or fingers upward at a uniform rate while the filaments are entering between and passing along said inclined portions, and prevent displacement of the filaments. It will be understood, however, that the fingers need not necessarily have inclined portions, but may be otherwise formed as desired, but if the inclined portions are used, the resultant movement of the inclined portions on the simultaneous upward movement thereof and the slight longitudinal movement thereof, referred to, will cause the filaments to pass properly between the holding fingers.

Suitable means may be provided to impart to the carrier the character of lifting movements described. In the present instance, to accomplish this, a cam 257 (Figs. 13 and 14) is adjustably connected by screw bolts 259 with a face of a disk 261 fast on the shaft 51, referred to, which is driven from the main driving shaft as described. Coöperating with the cam 257 is a roller 263 on a pin 265 at the free end of an arm 267 fast on one of the rock shafts 251, referred to. Also, on the free end of the arm 267 is a shoe having a follower point 269. The cam 257 has a portion $u$—$v$ for engagement with the roller 263 to impart a prompt lift of the carrier bar from its base until the tips of the holding fingers or jaws are brought to the plane of the filaments distended by the grippers. Further rotation of the cam will then cause the roller 263 to pass from the cam at $v$, and the follower point 269 then rides along the supplemental cam piece 271 to the point $w$. This produces the character of the lifting required to cause the inclined portions of the holding fingers to pass properly between them. Further rotation of the cam will cause the control to pass from the follower point 269 back to the roller 263, which will travel along a circular arc portion of the disk 261 between the points w—x, and produce the dwell of the carrier for a sufficient period to allow the transfer and severing of the filaments as described. Further rotation of the cam will cause the control to pass again to the follower point 269, which will pass sharply over the point y of the cam piece 271 and permit the carrier to promptly drop on severing of the filaments by the cutter means. Further rotation of the cam will transfer the control back to the roller 263, which will travel along the cam portion y—z and thereby lower the carrier bar to its base.

Suitable means is provided for shifting the bar 171 for closing the holding fingers or jaws and severing the filaments from their source of supply when the carrier is lifted to bring the fingers or jaws into position to take the filaments from the grippers. To accomplish this, in the present instance, an actuator may be provided conveniently in the form of an arm 273 (Figs. 5, 9 and 10) projecting laterally from the upper end of a vertical shaft 275 journaled in bearings 277 projecting laterally from the frame 175, referred to. The actuator or arm 273 may be rocked to engage a lug or shoulder 279 on the right end of the operating bar 171 (Fig. 10) when the carrier is in position to receive the filaments, and shift the lug and bar to first close the holding fingers to cause them to grip the filaments, and then to operate the cutter means to sever the filaments. Suitable means may be provided to impart to the shaft 275 and the arm 273 the rocking movement described. In the present instance, to accomplish this, the shaft 275 has an arm 281 fast thereon carrying a roller 283 adapted to engage the face of a cam 285 fast on the shaft 187 of the screw or spiral means for feeding the carrier longitudinally of the machine. The shaft 275 may be raised and lowered with the carrier bar 139. To accomplish this, the shaft 275 may slide longitudinally in its bearings 277, and its lower end may have a foot 287 (Fig. 9) adapted to rest upon one of the cross bars 241 for raising and lowering the carrier bar. The construction is such that when the carrier is lowered to rest on its base, the cam follower roller 283 will be down out of range from the cam 285, as will be noted in Fig. 1, but when the carrier bar is elevated, the shaft 275 will also be elevated and the roller 283 will be brought into range of the cam 285, as will be noted in Figs. 5 and 9. The elevation of the carrier and the actuator is so timed with respect to the rotation of said cam, that the latter will shift the operating bar 171 to close the holding fingers or jaws and sever the filaments from the source of supply at the proper time. After these operations have been completed, the carrier bar and shaft will lower again, thereby removing the roller 283 from the cam and further rotation of the cam will not affect the actuator until the roller is again brought in range with the cam.

After the carrier jaws have been closed as described to take the filaments from the grippers, and the carrier bar has been lowered down onto its base, the screw or spiral means feeds the carrier and its base toward the delivery end of the machine a sufficient distance to allow the filaments to be properly positioned on the web. Then it is desirable to open the holding fingers or jaws to release the filaments and permit the latter to travel onto and between the rolls 125 and 127, referred to. To accomplish this, in the present instance, a dog 287 (Figs. 10 and 11) may be pivotally mounted on a pin 289 mounted on the carrier bar 139, said pin having one end adapted to engage a lug or shoulder 291 and its opposite end connected by a coil spring 293 with a pin 295 on said carrier bar 139. A stop pin 297 may be mounted in a fixed position in the path of the dog 287, said stop pin, in the present instance, being mounted on a plate 299 adjustably secured to the guide channel 175 by screw bolts 301 entered through elongated slots in said plate. The construction is such that when the carrier bar has been fed a sufficient distance to the left (Figs. 10 and 11), the dog will be brought into engagement with the stop pin 297 and further movement of the carrier bar will rock said dog on the pin 289 and shift the jaws and cutter operating member 171 from its position shown in Fig. 10 to its position shown in Fig. 11, thereby opening the jaws and releasing the filaments from the carriers. Before the end of the travel of the carrier bar to the left of Figs. 10 and 11, the dog will wipe past the stop pin 297. On the return movement of the carrier bar toward the right of Figs. 10 and 11, the dog will again engage the stop pin, but will be permitted by the spring 293 to wipe idly past said stop pin away from the lug 291. After passing the stop pin the spring will return the dog into engagement with the lug 291 and hold said dog in position where it will be in readiness to again operate to open the jaws the next time the carrier bar travels to the left of Figs. 10 and 11.

When the actuator 273, referred to, shifts the operating member 171 to the right of Fig. 10 to close the jaws and cause the cutter to sever the filaments, there may be a tendency for the carrier to move or react to the right of Fig. 10. To prevent any possibility of such movement and to relieve the shoe or follower 193 which engages the screw or spiral means from the burden of holding the carrier against such movement, suitable stop means may be provided, in the present instance, in the form of a channel-shaped member 303 (Fig. 9) mounted on an arm 305 projecting upward from the right end of the frame 175, the flanges 303ª of said channel member being adapted to engage portions 306 (Figs. 1, 3, 4 and 9) at the right end of the carrier bar 139. An angle 307 on said bar is adapted to enter between said flanges to contribute to the positioning of said bar.

To shift the carrier bar 139 to the left as it is moved up by the cam 257, in order that the inclined ends of the jaws may move obliquely to the left to properly receive the filaments as described, said carrier bar end portions 306 and the lower ends of the channel flanges may be beveled as shown in Fig. 9, so that the bar will be given the movement required.

The reaction from the upward movement of the bar carrying the resilient fingers and from the upward movement of the cutter, may tend to press the carrier bar downward in its upward position presenting the holding fingers in the plane of the filaments distended by the grippers. Suitable stop means may be provided to prevent such downward movement of the carrier bar, in the present instance, in the form of a stop 309 (Figs. 1, 9 and 10) on a slide stud 311 in a boss 313 projecting laterally from the arm 305, referred to. Suitable means may be provided to shift this slide stud to present its stop under the carrier bar after the latter is elevated, and to withdraw the stop from the bar to allow the latter to be lowered. To accomplish this, in the present instance, the slide stud has a finger 315 projecting therefrom through a slot in the boss 313, said finger being engaged by a fork 317 on a rocker 319 fulcrumed on a pin on a bracket 321 carried by the arm 305. The rocker 319 has a pair of arms carrying rollers 323 adapted to engage the opposite faces of a cam 325 mounted on the shaft 187 for the screw or spiral means for traversing the carrier. The construction is such that rotation of the cam 325 will rock the rocker 319 and cause the stop 309 to be shifted beneath the carrier bar after the latter has reached its upper position. The stop remains beneath said bar until after the holding fingers have been closed to grasp the filaments and the cutter has been operated to sever the filaments from their source of supply. Then the rocker retracts the stop 309 from beneath the carrier bar to allow the latter to descend.

As stated, it may be desired to apply transverse reinforcing filaments to webs on receivers of varying widths. The adjustability of the screw or spiral means for distending the filaments varying distances in accordance with varying widths of webs, has already been described. The frames 175 supporting the guide channels, the jaw carriers and operating parts associated therewith may be adjusted along the supporting rods 179 for the frames 175, and held in different positions according to the varying widths of the web. Since the bevel gears 211 in the transmission to the screw or spiral means for traversing the carriers longitudinally of the machine, are splined to the shaft 215, the said transmission will always be in readiness for traversing the carrier in its different positions of adjustment. Also, the push rods 235 for elevating the carrier bars 139 and the feet 287 for lifting the vertical shafts 275 for the actuators of the operating members 171 for closing the fingers and operating the cutters, may slide along the cross bars 241 transversely of the machine and thereby always be in readiness to operate when the carrier supporting frames 175 are adjusted to conform to webs of varying widths.

The table 125, referred to, for guiding the web in its transit longitudinally of the machine, may register with the upper ends of the longer flanges of the guide channels 173 (Figs. 2 and 5) and said table may be formed of side sections 125ª and an intermediate section 125ᵇ. The side sections are secured to slides 328 held by screws 329 on brackets 331 attached to the guide channels 175, and said slides are guided by grooves 333 (Figs. 3 and 4) in the upper ends of brackets 335 fast on the transverse rods 179. The intermediate section 125ᵇ is detachably secured by screws to the upper ends of the brackets 335. The construction is such that the intermediate section may be inserted or removed and the side sections may be adjusted toward or from each other to vary the effective width of the table as required. Thus, by very simple adjustment, the entire machine may be adapted for the application of transverse reinforcing filaments to webs of different widths, as required.

The operation of the machine will be readily understood from the foregoing description. The web to be reinforced is fed longitudinally through the machine continuously; the grippers distend a series of filaments transversely of the machine; the carrier is moved upward to bring its fingers in the plane of the distended filaments; the fingers are then closed to take the filaments from the grippers; the filaments are severed from their source of supply; then the carriers are lowered to their bases and fed by the screw or spiral means longitudinally of the machine toward the delivery end thereof, thereby holding the filaments on the web and moving the filaments in unison therewith for a sufficient distance to allow the filaments to be properly held by the adhesive or other coating on the web; then the fingers are opened to release the filaments and the carrier is returned toward the feed-in end of the machine and elevated again into the plane of the next series of filaments which have in the meantime been distended by the grippers; and the cycle of operations described are repeated as before. Thus successive series of filaments will be applied to the continuously moving web and be carried by the latter to and between the rolls 127 and 129 at the delivery end of the machine. If it is desired to apply the transverse reinforcing filaments between the two plies of paper or other material, a second web c is superposed on the web a, and the transverse filaments applied thereto as described, the web c being pressed into adhesive engagement with the web a as the webs and filaments pass between the rolls 127 and 129. If it is desired to also apply longitudinal reinforcing filaments to the web, the longitudinal filaments b may be conducted to and between the webs as they pass between said rolls.

It will be understood that the invention is not limited to the specific embodiment shown, but that various deviations may be made therefrom without departing from the spirit and scope of the appended claims.

What is claimed is:—

1. A machine of the character described, comprising in combination, means for feeding material to be reinforced by a series of transverse reinforcing filaments, means for distending a plurality of reinforcing filaments transversely of the material to be reinforced, carrier means for taking the plurality of transversely arranged reinforcing filaments from the distending means and delivering them to the material to be reinforced, and screw or spiral means for moving said carrier means and reinforcing filaments in the direction of feed of the material to be reinforced.

2. A machine of the character described, comprising in combination, a supporting frame, drawing or distending means for drawing reinforcing filaments from a source of supply and distending them transversely of the machine frame, carrier means for taking the transversely arranged reinforcing filaments from the distending means, and screw or spiral means for moving said carrier means and reinforcing filaments longitudinally of the machine frame.

3. A machine of the character described, comprising in combination, carrier means for simultaneously taking a plurality of reinforcing filaments from a source of supply, screw or spiral means arranged longitudinally of the machine for moving said carrier means and plurality of reinforcing filaments longitudinally of the machine, and means for rotating said screw or spiral means.

4. In a machine of the class described, the combination of means for drawing reinforcing filaments from a source of supply and distending them transversely of the machine, screw means for moving the transversely distended filaments, and means for operating said screw means to cause the distended filaments to travel in a direction at right angles to their length.

5. A machine of the character described, comprising in combination, carrier means for simultaneously taking a plurality of reinforcing filaments from a source of supply, and screw or spiral means for reciprocating said carrier means longitudinally of the machine.

6. A machine of the character described, comprising in combination, carrier means for simultaneously taking a plurality of reinforcing filaments from a source of supply, and screw means to reciprocate said carrier means longitudinally of the machine to intermittently take filaments from said source of supply, said reciprocating means having provision for maintaining positive control over said carrier means throughout its reciprocatory movement.

7. A machine of the character described, comprising in combination, means for drawing or distending filaments from a source of supply, carrier means for taking the filaments from the distending means and carrying said filaments in a path transverse to their distended movement, and means to positively reciprocate said carrier means and maintain positive control over said carrier means.

8. A machine of the character described, comprising in combination, drawing or distending means for drawing or distending filaments from a source of supply, means to reciprocate said drawing or distending means while continuously maintaining positive control over said drawing or distending means, carrier means for receiving the filaments from the drawing or distending means, and means to reciprocate said carrier means while continuously maintaining positive control over said carrier means.

9. A machine of the character described, comprising in combination, means for drawing or distending filaments from a source of supply, carrier means for taking the filaments from the drawing or distending means, means to move the carrier means toward and from the drawing or distending means, and screw or spiral means for reciprocating the carrier means.

10. A machine of the carrier described, comprising in combination, means for drawing reinforcing filaments from a source of supply, carrier means for receiving the filaments from the drawing means, means intermittently to move said carrier means toward the filaments held by the drawing means to take the filaments from the latter, and a pair of screws or spirals for reciprocating said carrier means.

11. In a machine of the class described, the combination of a receiver, means for drawing filaments from a source of supply and placing them transversely relative to the receivers, and screw means for moving the filaments longitudinally of the machine at right angles to their length.

12. A machine of the character described, comprising in combination, drawing or distending means for drawing or distending filaments from a source of supply, screw or spiral means to actuate said drawing or distending means, carrier means for taking the filaments from said drawing or distending means, and screw or spiral means to actuate said carrier means.

13. A machine of the character described, comprising in combination, drawing means for drawing reinforcing filaments from a source of supply, carrier means for taking the filaments from said drawing means, and screw or spiral means to actuate said carrier means and having means for causing said carrier means to dwell while taking the filaments from the drawing means.

14. In a machine for placing reinforcing filaments transversely of a receiver, the combination of grippers adapted to seize a plurality of reinforcing filaments and place them in transverse relation to the receiver, carrier means to transfer the filaments from the grippers to the receiver and move the filaments in unison with the receiver, and dual screw or spiral means for moving the carrier means.

15. In a machine for placing reinforcing filaments transversely of a receiver, the combination of a gripper adapted to seize a filament and place the same in transverse relation to the receiver, screw or spiral means to move the gripper transversely of the receiver, and screw or spiral means for moving the receiver transversely to the path of movement of the gripper.

16. A machine of the character described, comprising in combination, carrier means for receiving a plurality of reinforcing filaments and moving the filaments longitudinally of the machine, and means for reciprocating said carrier means with a gradually varying rate of movement near the limits of its reciprocation and a uniform rate of movement intermediate its varying rate movements.

17. A machine of the character described, comprising in combination, carrier means for receiving a plurality of reinforcing filaments and moving the same longitudinally of the machine, and screw or spiral means for reciprocating said carrier means and formed to cause the carrier means to dwell when receiving said filaments.

18. A machine of the character described, comprising in combination, carrier means for receiving a plurality of reinforcing filaments and moving the same longitudinally of the machine, and screw or spiral means for moving the carrier means and formed to cause the carrier means to dwell when receiving the filaments and then convey them at a uniform speed longitudinally of the machine.

19. A machine of the character described, comprising in combination, drawing means for drawing reinforcing filaments from a source of supply, carrier means for receiving the filaments from said drawing means, and means intermittently to feed said carrier means longitudinally of the machine including a pair of screws or spirals, and means operatively connecting said screws or spirals with said carrier means.

20. A machine of the character described, comprising in combination, carrier means for placing a plurality of filaments transversely of a receiver, and means intermittently to feed said carrier means in unison with said receiver including a pair of screws at opposite sides of said carrier means, and means operatively to connect said screws with said carrier means, each of said screws being formed to reciprocate said carrier means.

21. A machine of the character described, comprising in combination, carrier means for receiving reinforcing filaments and moving the same longitudinally of the machine, screw or spiral means for reciprocating said carrier means, and means continuously to rotate said screw or spiral means.

22. A machine of the character described, comprising in combination, carrier means for receiving reinforcing filaments and moving the same longitudinally of the machine, and means for moving said carrier means including a shaft having spiral cross grooves thereon, and means operatively to connect said grooves with said carrier means.

23. A machine of the character described, comprising in combination, carrier means for receiving reinforcing filaments and moving the same longitudinally of the machine, and means for so moving said carrier means including cross screw means.

24. A machine of the character described, comprising in combination, carrier means for receiving reinforcing filaments, screw or spiral means for moving said carrier means longitudinally of the machine, and means for lifting said carrier means into position to receive the reinforcing filaments.

25. A machine of the character described, comprising in combination, carrier means for receiving reinforcing filaments, screw or spiral means for moving said carrier means longitudinally of the machine, a cam for lifting said carrier means into position to receive the reinforcing filaments and means for operating the cam.

26. A machine of the character described, comprising in combination, drawing means to draw or distend a plurality of reinforcing filaments transversely of the machine, carrier means for receiving the filaments from said drawing means, means to lift said carrier means to the plane of the filaments held by the drawing means, and screw or spiral means for moving the carrier means and the filaments longitudinally of the machine.

27. A machine of the character described, comprising in combination, drawing means for drawing or distending reinforcing filaments transversely of the machine, carriers for receiving the filaments from said drawing means, a cam, and means operatively connecting said cam with both of said carriers to move the latter to and from positions for receiving the filaments from said drawing means.

28. A machine of the character described, comprising in combination, drawing means for drawing or distending reinforcing filaments transversely of the machine, carrier means having oblique jaws for receiving the filaments from the drawing means, and means to impart a composite lifting and longitudinal movement to said carrier means, that the oblique jaws may receive the filaments.

29. A machine of the character described, comprising in combination, drawing means for drawing or distending reinforcing filaments transversely of the machine, carrier means having oblique jaws for receiving the reinforcing filaments and moving the same longitudinally of the machine, and cam and screw means for concurrently imparting a lifting and longitudinal movement to said carrier means, that the oblique jaws may receive the filaments between them.

30. A machine of the character described, comprising in combination, drawing means for drawing reinforcing filaments transversely of the machine, a carrier member having jaws for receiving the reinforcing filaments from the drawing means and moving the same longitudinally of the machine, a base for said carrier member, means to lift said member from said base into position to receive the filaments, and means to move said base and member longitudinally of the machine.

31. A machine of the character described, comprising in combination, drawing means for drawing filaments transversely of the machine, a carrier member for receiving the filaments from said drawing means, a base for said carrier member, guide elements for said carrier member projecting upward from said base, rods for sliding said member up along said elements above said base, means to reciprocate said rods, and means to move said base and member longitudinally of the machine.

32. A machine of the character described, comprising in combination, drawing means for drawing filaments transversely of the machine, a carrier member for receiving the filaments from said drawing means, means for moving said carrier member into position to receive said filaments including a vertically reciprocable rod, and cam means for reciprocating said rod.

33. A machine of the character described, comprising in combination, drawing means for drawing filaments transversely of the machine, carrier members at opposite sides of the machine for receiving the filaments from said drawing means, and means to lift said members into position to receive the filaments, including vertically reciprocable rods, a cross member coöperating with said rods, and cam means for raising and lowering said cross member.

34. A machine of the character described, comprising in combination, drawing means for drawing reinforcing filaments transversely of the machine, a carrier member for receiving the filaments from said drawing means, a base for said member, means to lift said member above said base into position to receive the filaments, a follower connected to said base, and a rotary screw coöperating with said follower to move said base and carrier member longitudinally of the machine.

35. A machine of the character described, comprising in combination, a carrier member for receiving reinforcing filaments and moving the same longitudinally of the machine, a base for said carrier member, a guide for said base disposed longitudinally of the machine, a follower connected to said base, and screw means coöperating with said follower to move said base and carrier member along said guide.

36. A machine of the character described, comprising in combination, drawing means for drawing filaments transversely of the machine, carrier means having jaws for receiving the filaments from said drawing means, an actuator to close said jaws to hold the filaments, and means to simultaneously lift said carrier means and actuator into a position to cause said jaws to receive said filaments.

37. A machine of the character described, comprising in combination, drawing means for drawing filaments transversely of the machine, carrier means having jaws for receiving the filaments and moving the same longitudinally of the machine, an actuator for closing said jaws, means to elevate said carrier means and actuator toward the filaments, and cam means for operating the actuator when in its elevated position.

38. A machine of the character described, comprising in combination, drawing means for drawing reinforcing filaments transversely of the machine, carrier means having jaws for receiving the filaments from said drawing means, a shaft, a screw thereon for moving said carrier means longitudinally of the machine, a cam on said shaft, an actuator for closing said jaws, means for lifting said carrier means and actuator toward the filaments, and means on said actuator movable therewith into operative relation with said cam on the lifting movement of said actuator.

39. A machine of the character described, comprising in combination, drawing means for drawing reinforcing filaments transversely of the machine, carrier means having jaws for receiving the filaments from said drawing means, means to lift said carrier means and jaws into position to receive the filaments, an actuator for closing said jaws to hold the filaments when said carrier means is in its elevated position, and means to hold said carrier means stationary during the closing of said jaws.

40. A machine of the character described, comprising in combination, drawing means for drawing filaments transversely of the machine, carrier means having jaws for receiving the filaments from said drawing means, means to lift said carrier means into position to receive the filaments, means to close said jaws to hold the filaments, and a stop to prevent longitudinal movement of said carrier means during the closing of said jaws.

41. A machine of the character described, comprising in combination, drawing means for drawing filaments transversely of the machine, carrier means having jaws for receiving the filaments from said drawing means, means to lift said carrier means and jaws into position to receive the filaments, means to close said jaws to hold the filaments, and means to prevent lowering of said carrier means during the closing of said jaws.

42. A machine of the character described, comprising in combination, drawing means for drawing filaments transversely of the machine, carrier means having jaws to receive the filaments from said drawing means, means to lift said carrier means and jaws into position to receive the filaments, means to close said jaws to hold the filaments, an element for preventing downward movement of said carrier means during the closing of said jaws, and cam means for moving said element into and out of operative position.

43. A machine of the character described, comprising in combination, drawing means for drawing reinforcing filaments transversely of the machine, carrier means having jaws for receiving the filaments from said drawing means, cutter means for severing the filaments from their source of supply and mounted on said carrier means adjacent said jaws, means to lift said carrier means, jaws and cutter means toward the filaments, and means to close said jaws to hold the filaments, and then shift said cutter means longitudinally of said carrier means to sever the filaments from their source of supply.

44. A machine of the character described, comprising in combination, carrier means having jaws for receiving reinforcing filaments from a source of supply, severing means for the filaments mounted on said carrier means, an operating member for said jaws and severing means movable longitudinally of said carrier means, means to lift said carrier means and jaws into position to receive the filaments, and an actuator for shifting said operating member longitudinally of said carrier means to grip the filaments and sever them from their source of supply when said carrier means is in its elevated position.

45. A machine of the character described, comprising in combination, carrier means having jaws for receiving reinforcing filaments from a source of supply and moving the same longitudinally of the machine, an operating member for said jaws movable longitudinally of said carrier means, means to reciprocate said carrier means longitudinally of the machine, means to shift said operating member to close said jaws to hold the filaments when the carrier means is substantially at one of its limits of reciprocatory movement, and means to shift said operating member to open the jaws to release the filaments when said carrier is substantially at its other limit of reciprocatory movement.

46. A machine of the character described, comprising in combination, carrier means having jaws for receiving reinforcing filaments from a source of supply, severing means for the filaments mounted on said carrier means, means to reciprocate said carrier means longitudinally of the machine, an operating member for said jaws and severing means movable longitudinally of said carrier means, means to shift said operating member to close the jaws and sever the filaments from their source of supply when the carrier means is in one position, and means for shifting said operating member to open the jaws and release the filaments when the carrier means is in another position.

47. A machine of the character described, comprising in combination, carrier means having jaws for receiving reinforcing filaments from a source of supply, means to reciprocate said carrier means in a rectilinear path longitudinally of the machine, an operating member for said jaws mounted on said carrier means, means to cause said operating member to close said jaws when said carrier means is in position to receive the filaments, and means for causing said operating member to open the jaws when the carrier means is in position to release the filaments.

48. A machine of the character described, comprising in combination, carrier means having jaws for receiving reinforcing filaments from a source of supply, means to reciprocate said carrier means in a rectilinear path longitudinally of the machine, an operating member for said jaws movable longitudinally of said carrier means, an actuator for said operating member, cam means for moving said actuator to cause said operating member to release said jaws to hold the filaments, and an element in the path of said operating member for moving the latter to open said jaws in the course of the movement of said carrier means longitudinally of the machine.

49. A machine of the character described, comprising in combination, drawing means for drawing or distending groups of filaments transversely of the machine, screw or spiral means for reciprocating said drawing means, means to feed fabric to be reinforced longitudinally of the machine, carrier means for receiving successive groups of filaments from the drawing means, means to move said carrier means to and from the plane of the filaments distended by the drawing means, and screw or spiral means for moving successive groups of filaments in unison with the fabric longitudinally of the machine.

50. A machine of the character described, comprising in combination, drawing means for drawing or distending filaments transversely of the machine, means to feed fabric to be reinforced by said filaments longitudinally of the machine, and screw or spiral means for reciprocating said drawing means transversely of the machine, said screw or spiral means having means for varying the effective length thereof to conform to fabrics to be reinforced of different widths.

51. A machine of the character described, comprising in combination, means for feeding fabric to be reinforced longitudinally of the machine, means for drawing or distending reinforcing filaments transversely of the machine, and means for operating said drawing means including screw or spiral means having a removable section for varying the extent of movement of said drawing means transversely of the machine.

52. A machine of the character described, comprising in combination, means for feeding fabric longitudinally of the machine, a series of grippers disposed longitudinally of the machine and adapted to draw or distend reinforcing filaments from a source of supply, a carrier for said grippers, and means to move said carrier transversely of the machine including screw or spiral means having provision for varying the effective length thereof.

53. A machine for placing reinforcing filaments transversely of a receiver, comprising in combination, drawing means for drawing or distending filaments transversely of the machine, feeding means for said drawing means having provision for varying the extent of feed thereof, carriers for taking the distended filaments from the drawing means, and means relatively to adjust said carriers to conform to receivers of different widths.

54. A machine for placing reinforcing filaments transversely of a receiver, comprising in combination, means for drawing or distending filaments transversely of the receiver, means for moving said drawing means varying distances transversely of the machine, carriers for taking the distended filaments from the drawing means and applying the same to the receiver, means relatively to adjust said carriers to conform to receivers of different widths, a table to guide the receiver between said carriers, and means to vary the effective width of said table to conform to receivers of different widths.

55. A machine for applying reinforcing filaments to fabrics, comprising in combination, means to feed the fabric to be reinforced longitudinally of the machine, a sectional adjustable table to support the fabric in its transit through the machine, carriers to take a series of distended filaments and apply the same to the fabric, and means relatively to adjust said carriers to conform to the adjustment of said sectional table.

56. A machine for applying reinforcing filaments to fabrics, comprising in combination, means to distend a plurality of reinforcing filaments transversely of the fabric, means to receive the distended filaments and apply the same to the fabric, means to vary the extent of distending movement of the distending means, and means to adjust said receiving means in accordance with the adjustment of said distended means, that reinforcing filaments may be applied to fabrics of different widths.

57. A machine for applying reinforcing filaments to fabrics, comprising in combination, means to feed the fabric to be reinforced longitudinally of the machine, an adjustable table for guiding the fabric in the course of its transit through the machine, carriers for taking a series of filaments and applying the same to the fabric on the table, means to feed said carriers longitudinally of the machine, supports for said carriers, and means relatively to adjust said supports in accordance with the adjustment of said table.

58. A machine for applying reinforcing filaments to fabrics, comprising in combination, means to feed the fabric to be reinforced longitudinally of the machine, carriers at opposite edges of the fabric for positioning the reinforcing filaments on the fabric, supports for said carriers, guides for said supports, and screw means to adjust said supports along said guides to conform to fabrics of different widths.

59. A machine for applying reinforcing filaments to fabrics, comprising in combination, means to feed the fabric longitudinally of the machine, carriers for positioning reinforcing filaments on the fabric, supports for said carriers, means to feed said carriers along said supports, and means relatively to adjust said carriers to conform to fabrics of different widths while maintaining the feeding means for said carriers in operative condition.

60. A machine for applying reinforcing filaments to fabrics, comprising in combination, means to feed the fabric longitudinally of the machine, grippers for distending a plurality of filaments transversely of the machine, carriers for receiving the distended filaments and positioning the same on the fabric, means to relatively move said carriers and grippers in a direction of approach to transfer the filaments from the grippers to the carriers, means to move the carriers longitudinally of the machine, and means relatively to adjust said carriers to conform to fabrics of different widths while maintaining the same in operative condition.

61. A machine for applying reinforcing filaments to fabrics, comprising in combination, grippers for distending filaments transversely of the machine, carriers having jaws for taking the distended filaments from the gripper means, supports for said carriers, screw or spiral means mounted on said supports for feeding said carriers longitudinally of the machine, means mounted on said supports for opening and closing said jaws, and means relatively to adjust said supports to conform to fabrics of different widths.

62. A machine of the character described, comprising in combination, a frame, drawing means mounted on said frame for distending reinforcing filaments transversely of the machine, screw or spiral means mounted on said frame for imparting the distending movements to said drawing means, a driving shaft, and a chain and sprocket wheels for transmitting the drive from said shaft to said screw or spiral means.

63. A machine of the character described, comprising grippers for distending filaments, a stationary gripper frame, a gripper carrier frame movable on said gripper frame transversely of the machine, screw or spiral means for actuating the gripper carrier frame, and means for driving said screw or spiral means.

64. A machine of the character described, comprising in combination, grippers for taking filaments from a source of supply and distending them, a fixed gripper frame, a gripper carrier frame movable transversely of the machine on said gripper frame, screw or spiral means for actuating said gripper carrier frame, carriers having jaws for taking the distended filaments from the grippers, and screw or spiral means for moving said jaw carriers longitudinally of the machine.

65. A machine of the character described, comprising in combination, grippers for distending filaments transversely of the fabric to be reinforced, screw or spiral means for moving said grippers transversely of the machine, a member having jaws thereon, means for raising said member to elevate said jaws to the plane of the distended filaments to take the latter from the grippers, and means for lowering said member and jaws to apply the filaments to the fabric.

In testimony whereof I have signed my name to this specification.

CHARLES H. HOWARD.